(No Model.)
A. M. JANOFSKY.
TIRE FOR VEHICLE WHEELS.
No. 599,060. Patented Feb. 15, 1898.
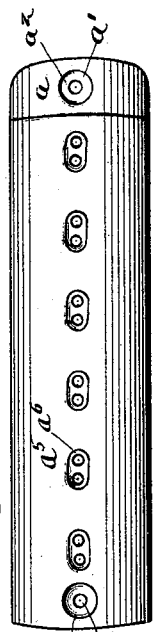
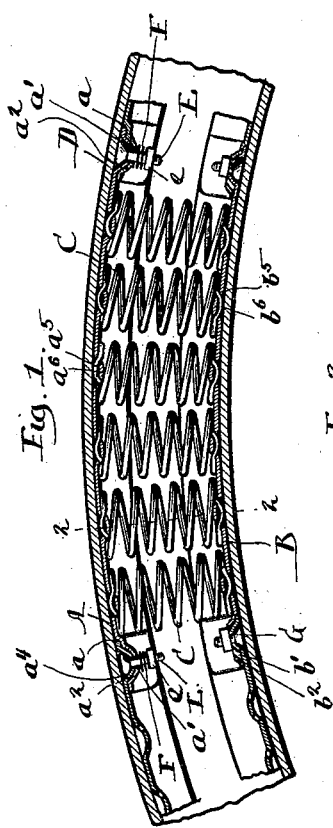
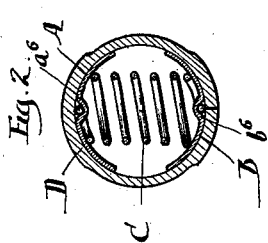
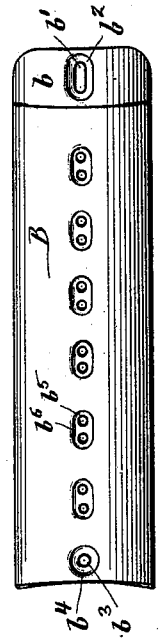
Witnesses:
Inventor:
A. M. Janofsky
By Price & Fisher
Attorneys.

UNITED STATES PATENT OFFICE.

ALEXANDER M. JANOFSKY, OF CHICAGO, ILLINOIS, ASSIGNOR, BY DIRECT AND MESNE ASSIGNMENTS, OF ONE-HALF TO HENRY CARSTENS, OF SAME PLACE.

TIRE FOR VEHICLE-WHEELS.

SPECIFICATION forming part of Letters Patent No. 599,060, dated February 15, 1898.

Application filed June 21, 1897. Serial No. 641,567. (No model.)

*To all whom it may concern:*

Be it known that I, ALEXANDER M. JANOFSKY, a resident of Chicago, in the county of Cook and State of Illinois, have invented certain new and useful Improvements in Tires for Vehicle-Wheels, of which I do declare the following to be a full, clear, and exact description, reference being had to the accompanying drawings, forming a part of this specification.

The present invention has for its object to provide a tire for vehicle-wheels that shall possess the advantages, first, of elasticity and resiliency incident to pneumatic tires, and, second, that shall have the further advantage over pneumatic tires of being proof against puncture and of great durability.

The invention, while more especially designed for the wheels of bicycles, will be found applicable for the wheels of other vehicles in which pneumatic or cushion tires are deemed desirable.

The invention consists in the novel features of construction hereinafter described, illustrated in the accompanying drawings, and particularly pointed out in the claims at the end of this specification.

Figure 1 is a view in central longitudinal section through a portion of a tire embodying my invention. Fig. 2 is a view in vertical cross-section on line 2 2 of Fig. 1. Fig. 3 is a detail plan view of one of the inner segment-plates. Fig. 4 is a detail plan view of one of the outer segment-plates.

In carrying out my invention I employ a series of outer segment-plates A and a series of inner segment-plates B, suitably connected together, and between these segment-plates are interposed a series of springs C, the segment-plates and springs being all inclosed within a tube or envelop D, preferably of rubber, canvas, or like flexible material. The precise construction, the number and arrangement of the segment-plates, and the construction, number, and arrangement of the coil-springs, and the character of the inclosing tube or envelop may be varied within wide limits without departing from the spirit of the invention, and while I have described in this specification what I regard as the preferred embodiment of my invention I do not wish it to be understood as restricted to the precise details of construction shown or described.

The outer segment-plates A will be formed of suitable length and number corresponding to the size of the tire. In cross-section these outer segment-plates are curved, and at their ends the plates overlap, as clearly shown in Fig. 1 of the drawings. Preferably each of the outer segment-plates A has one of its end portions depressed, as at $a$. Within this depressed portion is formed a hole $a'$ and around this hole a countersunk portion $a^2$. The opposite end of each of the segment-plates A is formed with a similar hole $a^3$ and around this hole a countersunk portion $a^4$. When the segment-plates are set together, as shown in Fig. 1, the end of one segment-plate will overlap the depressed end $a$ of the adjacent segment-plate, the countersunk portion $a^4$ of one segment-plate sitting within the correspondingly countersunk part $a^2$, that is formed within the depressed portion $a$ of the next segment-plate. Through the holes $a'$ and $a^3$, which are thus brought coincident, will be passed a retaining-bolt E, the head of which will sit within the countersunk part $a^4$ of one of the segment-plates, and upon the bolt E is held a coiled spring F, that bears against the inner face of the countersunk part $a^2$ of the segment-plate and against the threaded nut $e$ on the bolt.

The inner segment-plates B are each formed as shown more particularly in Fig. 3 of the drawings—that is to say, each of these segment-plates B has one end depressed, as at $b$, which depressed portion will be overlapped by the adjacent segment-plate B. In the depressed portion $b$ of the segment-plate is formed a long slot or hole $b'$, the metal about which is countersunk, as at $b^2$, and at the opposite end of each segment-plate B is formed a hole $b^3$, the metal about which is countersunk, as at $b^4$. The segment-plates B are preferably formed of sheet metal and of curvilinear shape, as clearly shown in the drawings. When the segment-plates are set together with their ends overlapping, as shown in Fig. 1, the holes $b^3$ of one plate will come opposite the slots $b'$ of the adjoining plate, and a bolt G will be passed through the hole $b^3$ and slot $b'$. The purpose in forming the slot $b'$ is to allow a slipping of the segment-plates B upon each other in order to enable the tire to be strung over the wheel-rim, as will presently more fully appear.

Between the inner and outer segment-plates A and B are placed a number of springs, preferably coil-springs C, the outer coils of which rest against the segment-plates, while the free ends of the springs are passed through holes $a^5$ and $b^5$, formed in countersunk parts $a^6$ and $b^6$ of the segment-plates. (See Fig. 1.) After the inner and outer segment-plates have been placed together, as shown, with the coil-springs between them, the tube or envelop D will be drawn over them and the tire will then have its normal shape, as shown in Figs. 1 and 2 of the drawings. Inasmuch as there is a slip-joint connection between the inner segment-plates B the inner portion of the tire can be stretched in order to enable the tire to be slipped over the rim of the wheel whereon it is to be used. By forming the outer portion of the wheel of segment-plates that overlap each other and are yieldingly connected together it will be seen that as the segment-plates are successively brought to the lowest point of the wheel and thereby caused to sustain the weight such plates will yield under the weight imposed thereon, the yielding action of the plates being resisted by the coil-springs C. The bolts E and springs F allow a flexure or yielding action of the segment-plates A with respect to each other, so that the continuity of the tire is practically unbroken.

My invention presents many advantages over a pneumatic tire, notably in the respect that while my tire has great resiliency, elasticity, and lightness it is practically invulnerable or proof against punctures, which so soon destroy the usefulness of pneumatic tires.

Any suitable material may be employed in forming the segment-plates of my tire, although I prefer to use thin sheet-metal for this purpose.

Having thus described my invention, what I claim as new, and desire to secure by Letters Patent, is—

1. A vehicle-tire comprising inner and outer segment-plates the ends of which are yieldingly connected together, springs interposed between said inner and outer plates and an inclosing tube or cover.

2. A vehicle-tire comprising inner and outer segment-plates, springs interposed between said plates, the outer plates having overlapping ends and bolts and springs for connecting said ends of the outer plates.

3. A vehicle-tire comprising inner and outer segment-plates and springs interposed between said plates, the inner segment-plates being connected by loose joints to permit the inner portion of the tire to be stretched over the wheel-rim.

4. A vehicle-tire comprising inner and outer segment-plates, the outer segment-plates having perforated and countersunk overlapping ends, and bolts for connecting said ends of the segment-plates, springs interposed between the inner and outer segment-plates and an inclosing tube.

5. A vehicle-tire comprising inner and outer segment-plates, the inner segment-plates having slotted and countersunk ends whereby a slip-joint is effected between said plates, springs interposed between the inner and outer segment-plates and an inclosing tube.

ALEXANDER M. JANOFSKY.

Witnesses:
 FRED GERLACH,
 ALBERTA ADAMICK.